A. T. BROWN.
MAKING SALT.

No. 185,667. Patented Dec. 26, 1876.

WITNESSES:
A. W. Almquist
John Goethals.

INVENTOR:
A. T. Brown
BY
ATTORNEYS.

UNITED STATES PATENT OFFICE.

ADDISON T. BROWN, OF ZILWAUKIE, MICHIGAN.

IMPROVEMENT IN MAKING SALT.

Specification forming part of Letters Patent No. 185,667, dated December 26, 1876; application filed June 20, 1876.

*To all whom it may concern:*

Figure 1:
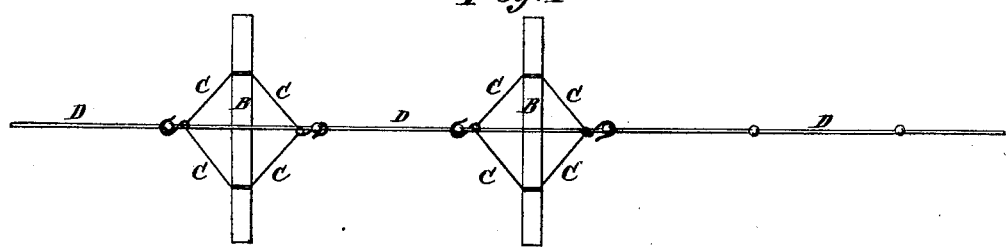
Figure 2:
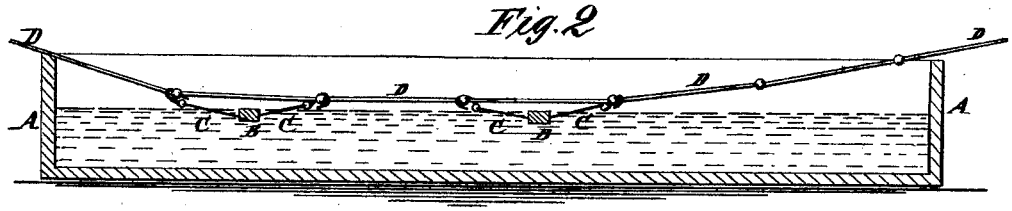
Figure 3:
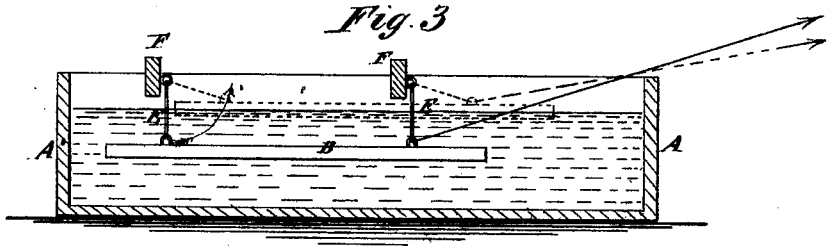
Figure 4:
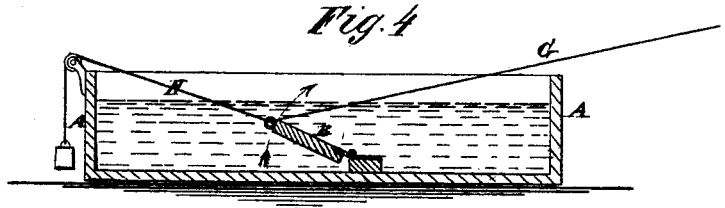
Figure 5:
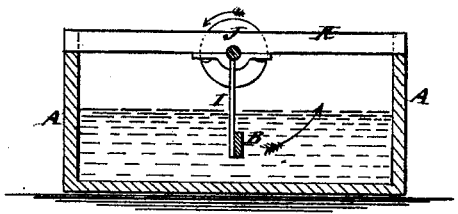

Be it known that I, ADDISON T. BROWN, of Zilwaukie, in the county of Saginaw and State of Michigan, have invented a new and useful Improvement in Making Salt, of which the following is a specification:

Figure 1 is a plan view of my improved agitator. Fig. 2 is a side view of the same shown in a grainer. Fig. 3 shows a modification of the same. Fig. 4 shows another modification of the same. Fig. 5 shows another modification of the same.

Similar letters of reference indicate corresponding parts.

The object of this invention is to furnish an improvement in salt-making, by means of which the salt may be made of any particular grade of fineness, and also of a uniform fineness without grinding, and without the use of grease.

The invention consists in the mode of preserving the salt crystals by precipitating them in the brine as soon as they have attained the desired size by means of agitating said brine by means of floats or bars suspended therein, as hereinafter fully described.

In making salt by evaporation the particles or crystals of salt form at the surface, and if the heat and other conditions of evaporation be the same, these particles will all attain the same size in the same time. If the brine be agitated or thrown into waves the salt particles will be precipitated, and after precipitation will not increase in size to any appreciable extent. If the intervals between each agitation are the same in length of time the salt crystals will be uniform in size. If the intervals between each agitation are long the salt crystals will be large, and if short the said crystals will be small, so that the grain of the salt or the size of the crystals of salt may be made of any desired size by simply regulating the intervals between each agitation.

A represents a grainer, a pan, or solar field-vat, and is constructed in the usual way. B are floats or bars made of wood or iron, or other suitable material. To the opposite sides of the floats or bars B are attached V-shaped wires or braces C, provided with hooks at their angles, which are hooked upon a wire, D, extending across the grainer pan or vat A. The hooks of the braces C are kept from slipping upon the wire D by knots or knobs formed upon or attached to said wire D, so that by pulling upon either end of the wire D the brine will be agitated or thrown into waves, which will cause the particles of salt to be precipitated.

The floats or bars B may be suspended by wires E from cross-bars F, attached to the grainer pan or vat A, as shown in Fig. 3, and the brine may be agitated by moving the floats or bars through the brine either endwise or sidewise, so as to bring them to the surface of the brine, as shown in Fig. 3; or the floats or bars B may be hinged (as in Fig. 4) to the bottom of the grainer pan or vat A, and the brine be agitated by turning the floats or bars B upon their hinges, so as to bring their free edges to the surface of brine; or the floats or bars B may be attached to the ends of arms I, (as in Fig. 5,) the other ends of which are attached to a shaft, J, which revolves or oscillates slowly by suitable mechanism in bearings attached to cross-bars K of the grainer pan or vat A, so as to dip said floats or bars B into the brine, and cause an agitation.

In all these cases the effect is produced by moving the floats or bars B through the brine, so as to agitate it, and give it a wave motion.

To produce a uniform grade of salt, the floats or bars B should be moved regularly once, and only once, in a certain length of time, said interval of time to be determined by the coarseness or fineness of the salt it is desired to make. Thus, if coarse, make the time long—if fine, make the time short—between each movement of said floats or bars B.

I disclaim all idea of any agitation of the brine simply for the purpose of keeping the surface of the brine clear, and to promote evaporation. I also disclaim all idea of any constant agitation, as salt made in that way will be too fine to dry properly; but I do claim that the grain of salt may be made uniform, and of any desired and uniform size, not exceeding that of coarse salt, which is precipitated by its own weight, by moving said floats or bars B through the brine, so as to cause regular agitations at regular intervals of time.

Having thus described my invention, I claim as new and desire to secure by Letters Patent—

The mode of forming salt crystals of a uniform size, and of any particular and uniform size, by precipitating said crystals in the brine by agitation of said brine at regular intervals of time, substantially as herein described.

ADDISON T. BROWN.

Witnesses:
   JAS. B. PETER,
   FRED ZIMMERMANN.